US009675926B2

(12) United States Patent
Lee et al.

(10) Patent No.: US 9,675,926 B2
(45) Date of Patent: Jun. 13, 2017

(54) OXYGEN CONCENTRATING METHOD AND APPARATUS HAVING CONDENSATE WATER REMOVING FUNCTION

(71) Applicant: SOGANG UNIVERSITY RESEARCH FOUNDATION, Seoul (KR)

(72) Inventors: Tae Soo Lee, Gyeonggi-do (KR); Hyun Seong Kim, Gyeonggi-do (KR); Shin Kyu Han, Seoul (KR); Seung Kwon Oh, Namyangju-si (KR); Kang Han Lee, Chuncheon-si (KR)

(73) Assignee: OXUS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/848,629

(22) Filed: Sep. 9, 2015

(65) Prior Publication Data

US 2017/0065926 A1    Mar. 9, 2017

(51) Int. Cl.
*B01D 53/047*    (2006.01)

(52) U.S. Cl.
CPC ........ *B01D 53/047* (2013.01); *B01D 2256/12* (2013.01); *B01D 2257/40* (2013.01); *B01D 2259/402* (2013.01)

(58) Field of Classification Search
CPC .............. B01D 53/047; B01D 2256/12; B01D 2257/40; B01D 2259/402
USPC ........................ 96/121, 134, 136; 95/96, 130
See application file for complete search history.

(56) References Cited

U.S. PATENT DOCUMENTS

| 4,302,224 A * | 11/1981 | McCombs | B01D 53/0446 55/DIG. 17 |
| 4,584,001 A * | 4/1986 | Dechene | B01D 53/0446 96/114 |
| 4,698,075 A * | 10/1987 | Dechene | B01D 53/0446 96/116 |
| 5,335,426 A * | 8/1994 | Settlemyer | B01J 20/3408 34/77 |
| 2005/0072306 A1* | 4/2005 | Deane | B01D 53/0446 96/109 |
| 2009/0211448 A1* | 8/2009 | McClain | B01D 53/047 95/211 |

(Continued)

FOREIGN PATENT DOCUMENTS

KR    10-2000-0030484 A    6/2000
KR    10-2000-0030484 A    6/2000

(Continued)

*Primary Examiner* — Frank Lawrence
(74) *Attorney, Agent, or Firm* — Rabin & Berdo, P.C.

(57) ABSTRACT

An oxygen concentrating apparatus includes: at least one adsorption bed which is filled with absorbent capable of selectively adsorbing nitrogen relative to oxygen; an air supplier which supplies pressurized air to the adsorption bed; a flow channel regulating valve unit which regulates flow channels by allowing the pressurized air to be supplied to the adsorption bed from the air supplier and by allowing the air to be discharged from the adsorption bed to be depressurized such that a nitrogen adsorption process and a nitrogen desorption process are alternately performed; and a water removing unit which separates water from the pressurized air supplied from the air supplier and removes the separated water. The flow channel regulating unit and the water removing unit are at least partially housed within a single housing.

7 Claims, 13 Drawing Sheets

(56) References Cited

U.S. PATENT DOCUMENTS

2012/0255446 A1* 10/2012 Eickhoff .............. B01D 53/047
96/111

FOREIGN PATENT DOCUMENTS

| KR | 10-2002-0007068 A | 1/2002 |
| KR | 10-2003-0017054 A | 3/2003 |
| KR | 10-2003-0017054 A | 3/2003 |

* cited by examiner

OXYGEN CONCENTRATING METHOD AND APPARATUS HAVING CONDENSATE WATER REMOVING FUNCTION

FIELD OF THE INVENTION

The present invention relates to a pressure swing adsorption-type oxygen concentrating method and apparatus.

BACKGROUND ART

An oxygen concentrating apparatus is an apparatus which separates and concentrates oxygen from ambient air and is widely used for domestic use, industrial use, medical use or the like.

Various types of an oxygen concentrating apparatus are used, and a pressure swing adsorption (PSA) type among them is based on a principle of separating and concentrating oxygen using absorbent and adsorbs nitrogen in the air using absorbent to increase the concentration of oxygen. Since the PSA type uses only the pressurized air and the absorbent, it doesn't emit pollutant and can be easily used, so it is widely used.

The absorbent which is generally used in an oxygen concentrating apparatus using a pressure swing adsorption process is synthetic Zeolite. Nitrogen is more easily adsorbed in Zeolite under a relatively high pressure than oxygen. Gas having a relatively high concentration of oxygen is obtained using this property.

At this time, if the Zeolite adsorbs nitrogen, an adsorption capacity thereof becomes deteriorated, so it is necessary to desorb nitrogen from the Zeolite to restore the original adsorption capacity.

For the adsorption of nitrogen, the pressurized air is supplied to an adsorption bed which is filled with absorbent, but at this time water may be generated during the pressurization of air. If the Zeolite is exposed to the pressurized air with water, the nitrogen adsorption capacity of the Zeolite is deteriorated, and the durability is deteriorated due to the pressure change during the PSA process so that the particle of the Zeolite may be worn out or broken.

In order to solve these problems the oxygen concentrating apparatus of the pressure swing adsorption type has a water removing unit. For example, a adsorption water removing method (Korean Patent Publication No. 10-2000-0030484) of passing the pressurized air through a water removing device having accumulated water drying agent such as silica gel or alumina or a freezing water removing method (Korean Patent Publication No. 10-2003-0017054) of reducing the temperature of dew point of the pressurized air to condense water of air has been introduced.

However, in the conventional art, the water removing process is performed independent from the oxygen concentrating processes, so the efficiency may be deteriorated. Further, the water removing device is formed as an independent part from the pressurized air flowing part, so the overall volume is increased. Further, there is a problem in that additional parts for removing water such as water filter should be provided.

DETAILED DESCRIPTION OF THE INVENTION

Technical Problem

The present invention has been made in an effort to provide an oxygen concentrating apparatus and a method thereof in which a water removing process is performed in connection with the oxygen concentrating process to improve the efficiency and also can remove water in the pressurized air without using a separate water removing device with great volume.

Technical Solution

According to an exemplary embodiment of the present invention, an oxygen concentrating method using an oxygen concentrating apparatus comprising a first adsorption bed and a second adsorption bed which are respectively formed to allow air supplied at lower portions thereof move upwardly and are respectively filled with absorbent capable of selectively adsorbing nitrogen relative to oxygen and performing oxygen centration by alternatively performing a pressurization process and a depressurization process of the first adsorption bed and the second adsorption bed, includes: performing a nitrogen adsorption in the first adsorption bed by supplying pressurized air to the first adsorption bed so as to increase pressure of the first adsorption bed and at the same time removing nitrogen from the second adsorption bed; equalizing pressures of upper portions of the first adsorption bed and the second adsorption bed by moving air of the upper portion of the first adsorption bed to the upper portion of the second adsorption bed when pressure of the first adsorption bed becomes a predetermined pressure; equalizing pressures of upper and lower portions of the first adsorption bed and the second adsorption bed by moving air of the upper portion of the first adsorption bed to the upper portion of the second adsorption bed and by moving air of the lower portion of the first adsorption bed to the lower portion of the second adsorption bed; performing a nitrogen adsorption in the second adsorption bed by supplying pressurized air to the second adsorption bed so as to increase pressure of the second adsorption bed and at the same time removing nitrogen from the first adsorption bed; equalizing pressures of upper portions of the first adsorption bed and the second adsorption bed by moving air of the upper portion of the second adsorption bed to the upper portion of the first adsorption bed when pressure of the second adsorption bed becomes a predetermined pressure; equalizing pressures of upper and lower portions of the first adsorption bed and the second adsorption bed by moving air of the upper portion of the second adsorption bed to the upper portion of the first adsorption bed and by moving air of the lower portion of the second adsorption bed to the lower portion of the first adsorption bed; and removing water separated from the pressurized aid which will be supplied to the first adsorption bed and the second adsorption bed for a predetermined time.

The removing of the separated water may be initiated at the starting point of the equalizing the pressure of the upper portions and is performed for the predetermined time.

The removing of the separated water may be initiated during the supplying of the pressurized air to the first adsorption bed and the second adsorption bed and is performed for the predetermined time, and the equalizing of the pressure of the upper portions may be initiated after termination of the removing the separated water.

The predetermined time may be set between 0.1 to 1 second.

An oxygen concentrating apparatus according to an exemplary embodiment of the present invention includes: at least one adsorption bed which is filled with absorbent capable of selectively adsorbing nitrogen relative to oxygen; an air supplier which supplies pressurized air to the adsorption bed; a flow channel regulating valve unit which regulates flow channels by allowing the pressurized air to be supplied to the adsorption bed from the air supplier and by allowing the air to be discharged from the adsorption bed to be depressurized such that a nitrogen adsorption process and a nitrogen desorption process are alternately performed; and a water removing unit which separates water from the pressurized air supplied from the air supplier and removes the separated water. The flow channel regulating unit and the water removing unit are at least partially housed within a single housing.

The water removing unit may include a water separation tank which defines a water separation space in which water is separated from the pressurized air supplied from the air supplier, and the housing may include a first air inlet which is extruded to the outside thereof so as to supply the pressurized air of the air supplier to the water separation space, a second air inlet which is extruded to the outside thereof so as to supply the pressurized air of the air supplier to the flow channel regulating unit, and an air moving passage which is formed so as to discharge the air having passed the water separation space to the outside. At this time, the oxygen concentrating apparatus may further include a cover which is selectively connected to cover the second air inlet and an outlet of the air moving passage so as to selectively form an air moving space including the second air inlet and the outlet of the air moving passage.

The water removing unit may include a water removing regulating valve which operates to selectively remove the water which is stored in the water separation space.

The at least one adsorption bed may include a first adsorption bed and a second adsorption bed, and the oxygen concentrating apparatus may further include: an on/off valve which is disposed to selectively connect upper communication ports of the first adsorption bed and the second adsorption bed; and an orifice which is disposed in a flow channel connecting the upper communication ports. The flow channel regulating valve unit may selectively regulate flow channels of the air supplier, lower communication ports of the first adsorption bed and the second adsorption bed, and a nitrogen discharging passageway. The pressurized air may be supplied to the first adsorption bed in a state that the on/off valve is off so that a nitrogen adsorption process is performed in the first adsorption bed, and the water removing unit may operate to remove water separated from the pressurized air in a state that the on/off valve is on after the nitrogen adsorption process in the first adsorption bed is terminated or while the nitrogen adsorption process in the first adsorption bed is being performed. The pressurized air may be supplied to the second adsorption bed in a state that the on/off valve is off so that a nitrogen adsorption process is performed in the second adsorption bed, and the water removing unit may operate to remove water separated from the pressurized air in a state that the on/off valve is on after the nitrogen adsorption process in the second adsorption bed is terminated or while the nitrogen adsorption process in the second adsorption bed is being performed.

Advantages Effects

According to the present invention, the water removing process is performed in connection with the oxygen concentrating process, so the overall efficiency can be improved. Further, since the flow channel regulating unit and the water removing unit are housed in a single housing, the structure is simple and the overall volume can be can reduced.

BRIEF DESCRIPTIONS OF DRAWINGS

DETAILED DESCRIPTION OF THE EMBODIMENTS

Figure 1:
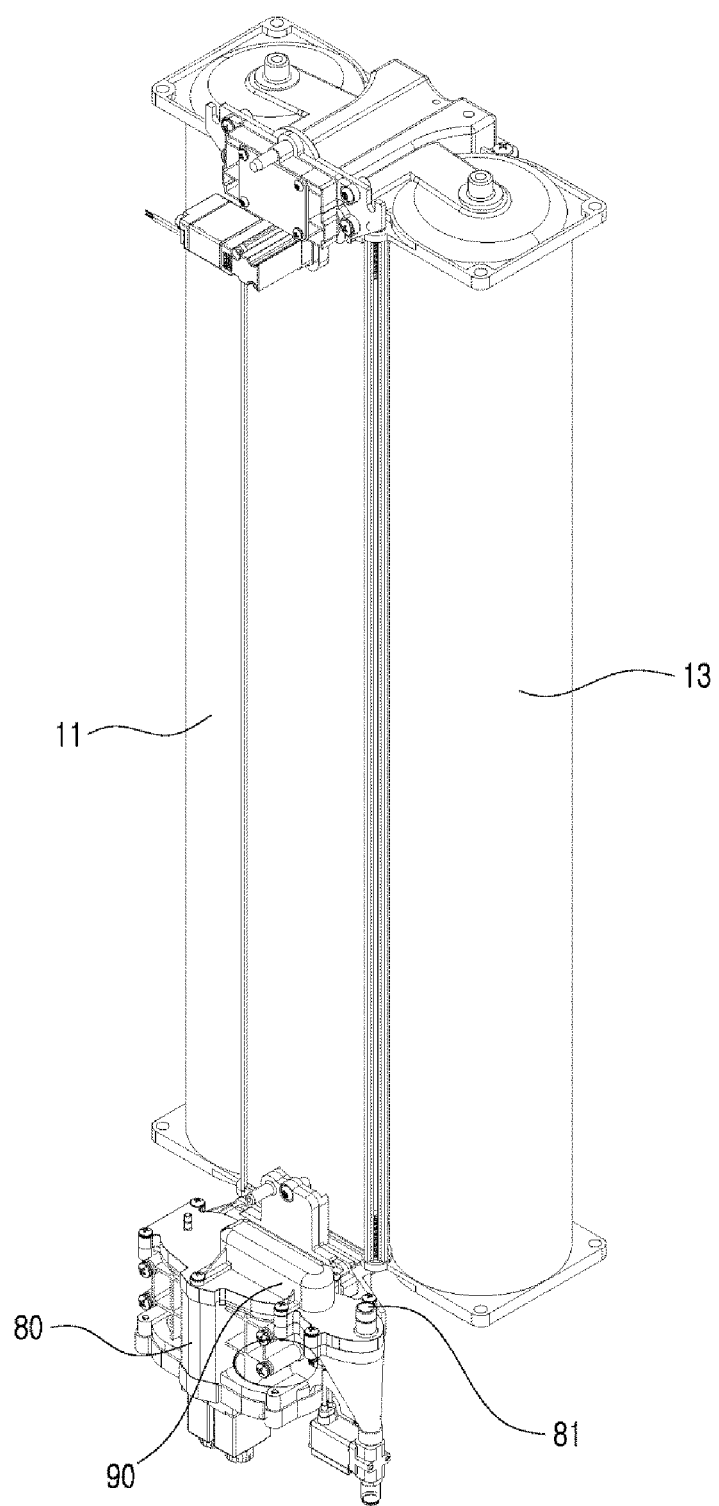
FIG. 1 is a schematic perspective view of an oxygen concentrating apparatus according to an embodiment of the present invention.

Hereinafter, embodiments of the present invention will be described in detail with reference to the accompanying drawings.

Referring to FIG. 1 to FIG. 4, at least one adsorption bed 11 and 13 which are filled with absorbent capable of selectively adsorbing nitrogen relative to oxygen are provided. Although two absorption beds 11 and 13 are exemplarily shown in the drawings, the number of the adsorption beds are not limited thereto.

The adsorption beds 11 and 13 may have a shape of a tower and are respectively provided with openings at the bottom and the top so that air may enter and exit, and for example may be formed such that air may into the lower opening and may move upwardly while passing through the absorbent and may then exit through the upper opening. The absorbent provided within the adsorption beds 11 and 13 may be formed of material which may adsorbs nitrogen more easily than oxygen in air, and may be Zeolite.

An air supplier 20 supplies air to the adsorption beds 11 and 13. The air supplier 20 may be a compressor which can pressurize air and can supply the pressurized air. For example, the air supplier 20 may supply the pressurized air to the adsorption beds 11 and 13 via an air supplying passage 101.

A flow channel regulating valve unit 30 is interposed between the air supplier 20 and the adsorption beds 11 and 13 to regulate flow channels so that a nitrogen adsorption process and a nitrogen desorption process are alternately performed. For example, the flow channel regulating valve unit 30 may operate to form an flow channel allowing the pressurized air from the air supplier 20 to be supplied to one of the adsorption beds 11 and 13 so that the nitrogen adsorption process is performed in the adsorbent of the corresponding adsorption bed and may also operate to form a flow channel allowing air within one of the adsorption beds 11 and 13 to exit to the outside via an exhaust sound absorber 40 so that the nitrogen desorption process is performed in the corresponding adsorption bed. At this time, the adsorption beds 11 and 13 are respectively connected to the flow channel regulating valve unit 30 via passages 101a and 101b.

The flow channel regulating valve unit 30 operates to selectively regulate flow passages of the passage 101 connected to the air supplier 20, the lower passages 101a and 101b of the adsorption beds 11 and 13, and a nitrogen discharging passage 41 to which the exhaust sound absorber 40 is provided.

Discharging passages 102 and 103 for discharging air from after the nitrogen adsorption (i.e., air of high oxygen concentration and will be called 'oxygen' hereinafter) are respectively connected to the upper openings of the adsorption beds 11 and 13, and check valves 51, 52 which operate to allow oxygen to flow only in a direction to be discharged may be provided to the respective discharging passages 102 and 103. Further, an on/off solenoid valve 60 which connects the discharging passages 102 and 103 may be provided. Further, an orifice 70 may be provided at a passage connecting the discharging passages 102 and 103.

A water removing unit 70 separates water from the air supplied from the air supplier 20 and removes the separated water. Since the air supplier 20 pressurizes air and supplies the pressurized air, water in the air may be condensed and in case that the condensed water enters into the adsorption beds 11 and 13, the nitrogen adsorption rate may be deteriorated, and the water removing unit 70 separates the condensed water and discharges the separated water so as to solve such problems.

Figure 3:
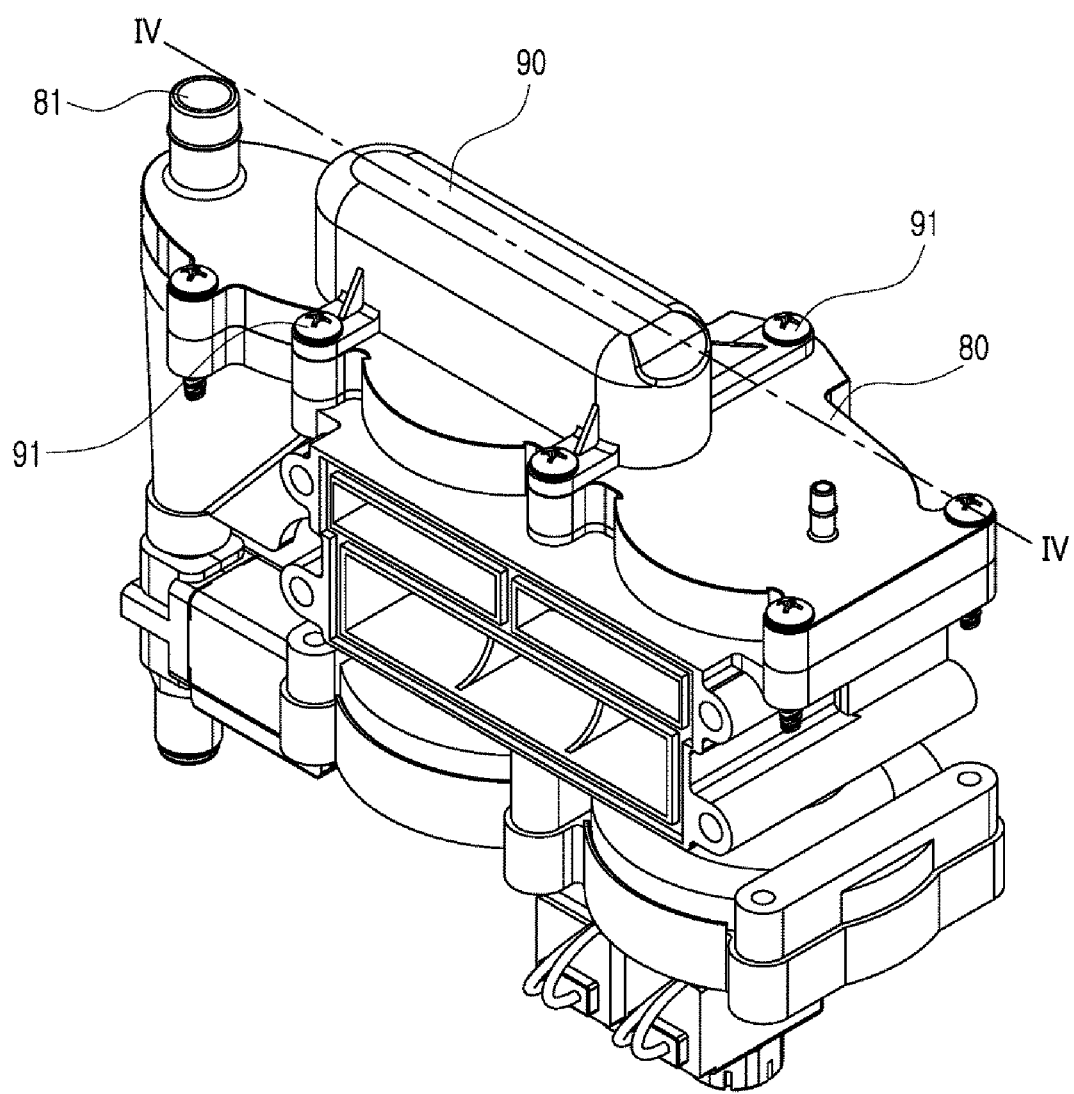
FIG. 3 is a perspective view of a housing receiving a flow channel regulating valve unit and a water removing unit of an oxygen concentrating apparatus according to an embodiment of the present invention.
Figure 4:
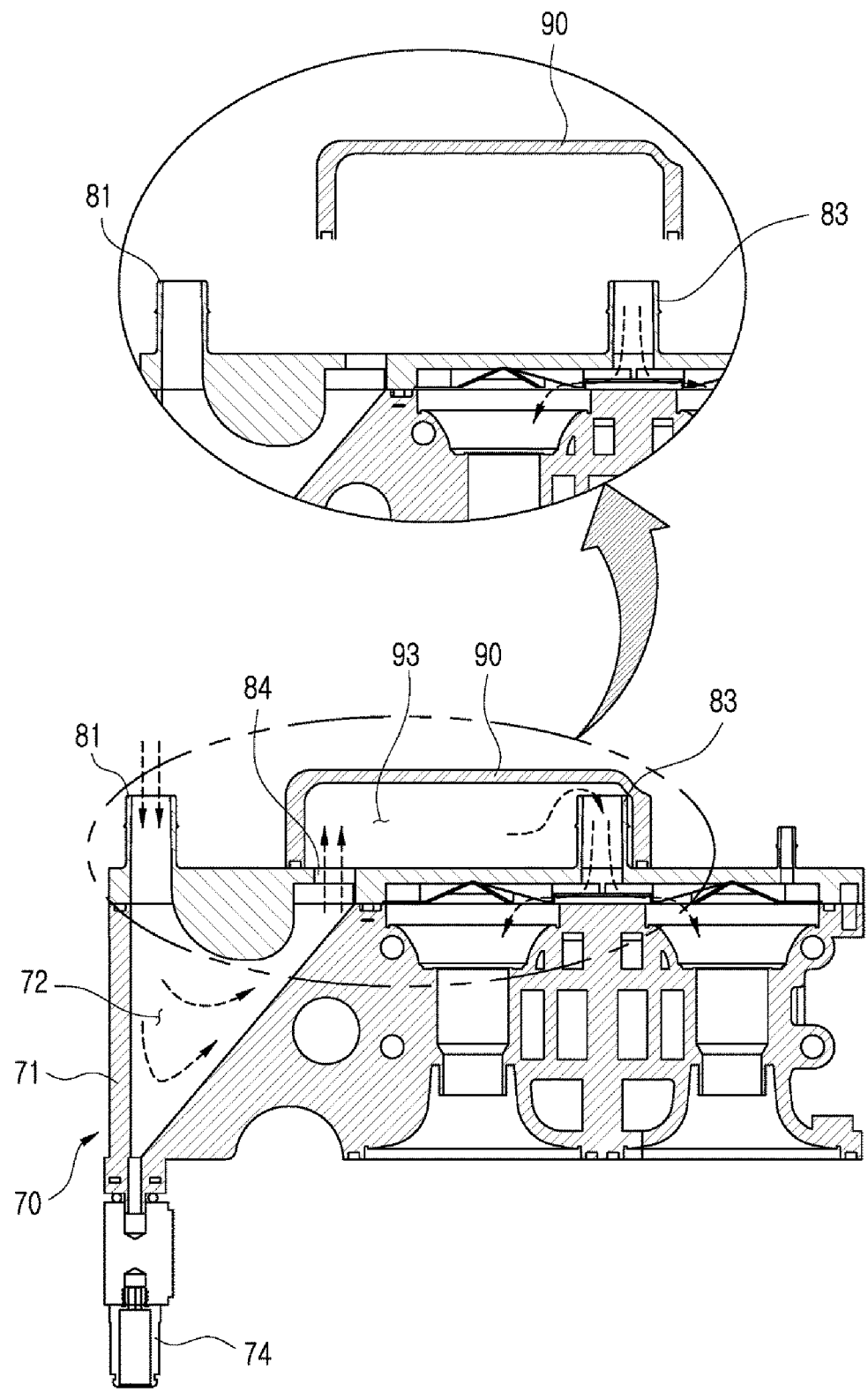
FIG. 4 is a sectional view taken along a line IV-IV in FIG. 3.

At this time, referring to FIG. 3 and FIG. 4, the water removing unit 70 and the flow channel regulating valve unit 30 are at least partially housed within a single housing 80. Since the water removing unit 70 and the flow channel regulating valve unit 30 are housed in one housing 80, an overall size of the apparatus can be substantially reduced.

The housing 80 may be formed to have passages connecting the flow channel regulating valve unit 30 and the passages 101a and 101b such that air discharged from the flow channel regulating valve unit 30 can be supplied to the adsorption beds 11 and 13.

Referring to FIG. 4, a first air inlet 81 for supplying air from the air supplier 20 to the water removing unit 70 is provided, and a second air inlet 83 for supplying air from the air supplier 20 to the flow channel regulating valve unit 30 is separately provided. If an air supplying tube forming the air supplying passage 101 connected to the air supplier 20 is connected to the first air inlet 81, the pressurized air is supplied to the flow channel regulating valve unit 30 after having sequentially passed the first air inlet 81, the water removing unit 70 and the second air inlet 83, and if the air supplying tube forming the air supplying passage 101 is connected to the second air inlet 83, the pressurized air is directly supplied to the flow channel regulating valve unit 30 via the second air inlet 83 without passing the water removing unit 70 (referring to the inside of a dotted line circle). With these structure, by selectively connecting the air supplying tube to one of the first and the second air inlets 81 and 83, it is possible to selectively realize the water removing function as desired. Accordingly, it is not necessary to separately design an apparatus having the water removing function and an apparatus not having the water removing function, and the water removing function can be selectively performed by one apparatus.

At this time, the first air inlet 81 and the second air inlet 83 are formed to be extruded to the outside of the housing 80 so that the air supplying tube can be connected thereto.

Meanwhile, referring to FIG. 4, the water removing unit 70 includes a water separation tank 71 defining a water separation space 72 for separating water from the air supplied through the first air inlet 81. As shown in FIG. 4, the water separation tank 71 may be provided within the housing 80, and the water separation space 72 may have a shape of a funnel whose width becomes smaller as it comes to the bottom. Water contained in the pressurized air is condensed and then moves to the bottom of the water separation space 72.

The housing 80 includes an air moving passage 84 which connects the water separation space 72 and the outside. The air from which water is removed in the water separation space 72 moves to the flow channel regulating valve unit 30 through the air moving passage 84. At this time, it is configured such that air discharged from the water separation space 72 through the air moving passage 84 enters into the flow channel regulating valve unit 30 through the second air inlet 83.

For such a flow of air, a cover 90 which can be selectively connected to the housing 80 is provided. For example, the cover 90 may be selectively connected to the housing 80 by a bolt 91. As shown in FIG. 4, in a state that the cover 90 is connected to the housing 80, an air moving space 93 which respectively communicates with the second air inlet 83 and the air moving passage 84. That is, the cover 90 is connected to the housing 80 so as to enclose an outer end of the second air inlet 83, and the air moving passage 84 is formed to the housing so as to communicate the water separation space 72 with the air moving space 93. With these structures, the pressurized air supplied to the water separation space 72 moves to the air moving space 93 via the air moving passage 84 after water separation, and then moves to the flow channel regulating valve unit 30 through the second air inlet 83.

At this time, in case that the water separation function is not needed, the air supplying tube connected to the air supplier 20 is directly connected to the second air inlet 83 in a state of removing the cover 90 (referring to the inside of the upper dotted line circle), so the pressurized air directly enters into the flow channel regulating valve unit 30 via the second air inlet 83 without passing through the water separation unit 70. In this case, as shown in the dotted arrow line, the pressurized air of the air supplier 20 is directly supplied to the flow channel regulating valve unit 30 without passing the water removing unit 70.

Figure 2:
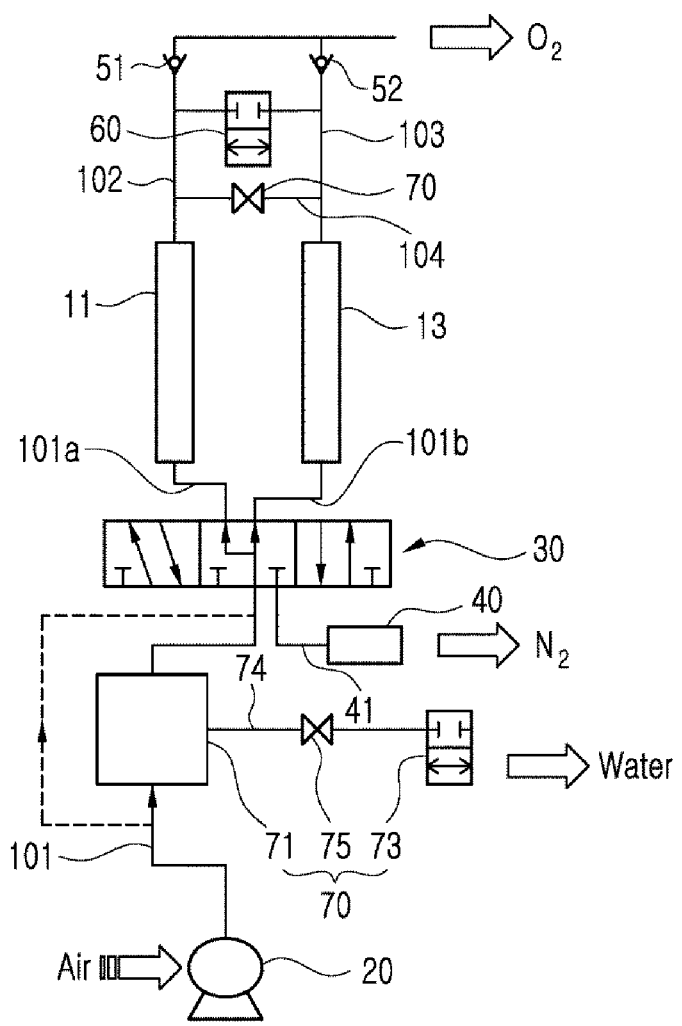
FIG. 2 is a diagram of an oxygen concentrating apparatus according to an embodiment of the present invention.

Meanwhile, referring to FIG. 2, the water removing unit 70 may further include a water removing regulating valve 73 which operates to be ON or OFF so as to selectively discharge water contained in the water separation space 72. By the ON/OFF operation of the water removing regulating valve 73, it is possible to make water removing occur at a desired time for a desired time period while the oxygen concentrating apparatus operates, so it is possible to minimize deterioration of performance due to discharge of water. Further, an orifice 75 may be provided to a water discharging passage 74 connecting the water separation space 72 and the water removing regulating valve 73.

Referring to FIG. 5 to FIG. 12, an oxygen concentrating method which is performed using an oxygen concentrating apparatus according to an embodiment of the present will be explained. Hereinafter, the adsorption bed which is designated by reference numeral 11 is called a first adsorption bed, and the adsorption bed which is designated by reference numeral 13 is called a second adsorption bed. The direction of arrows in the flow channel regulating valve 30 indicates the direction of flow channels.

Figure 5:
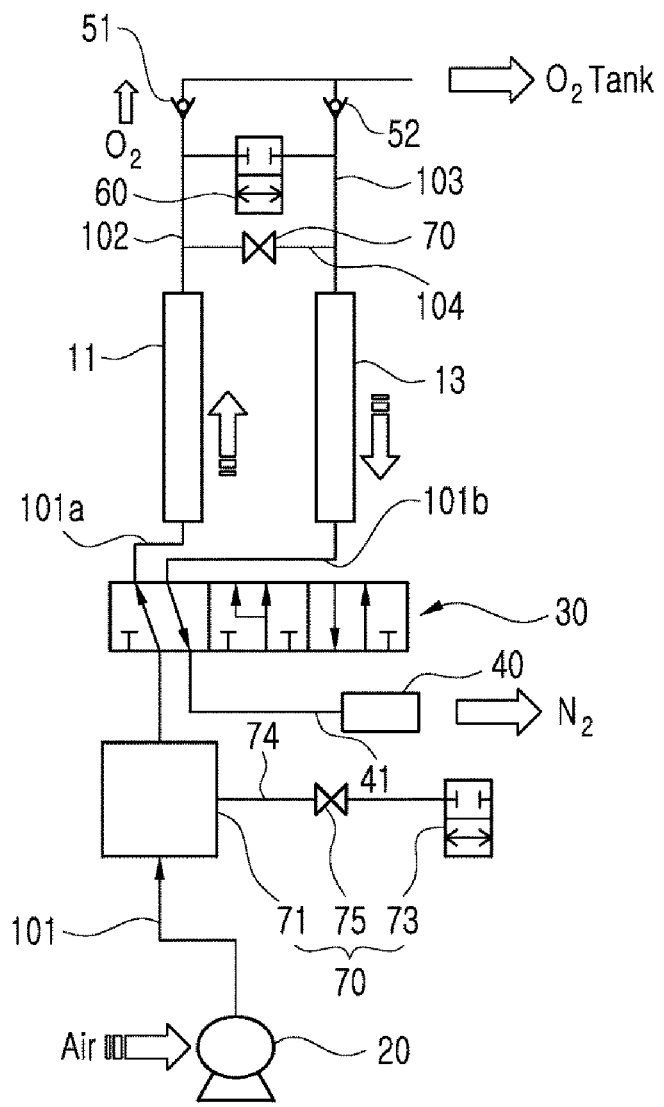
FIG. 5 to FIG. 12 are drawings for explaining oxygen concentrating processes of an oxygen concentrating apparatus according to an embodiment of the present invention.

First, FIG. 5 is a drawing for explaining a process of nitrogen adsorption as a result of a pressurization process in the first adsorption bed 11.

Referring to FIG. 5, the pressurized air supplied by the air supplier 20 is supplied to the first adsorption bed 11 via the flow channel regulating valve unit 30. Thus, the pressure in the first adsorption bed 11 increases so that nitrogen adsorption occurs and the air from which nitrogen is removed is supplied to the oxygen tank after passing the check valve 51. At this process, the on/off valve 60 which is disposed at upper sides of the adsorption beds 11 and 13 is maintained to be off. At this time, a portion of the air discharged from the first adsorption bed 11 flows into the second adsorption bed 13 via the orifice 70, and the air entering into the second adsorption bed 13 is discharged to the outside after passing the flow channel regulating valve unit 30 and the exhaust sound absorber 40. At this time, nitrogen which is adsorbed in the second adsorption bed 13 during the previous cycle is discharged together with air.

Figure 6:
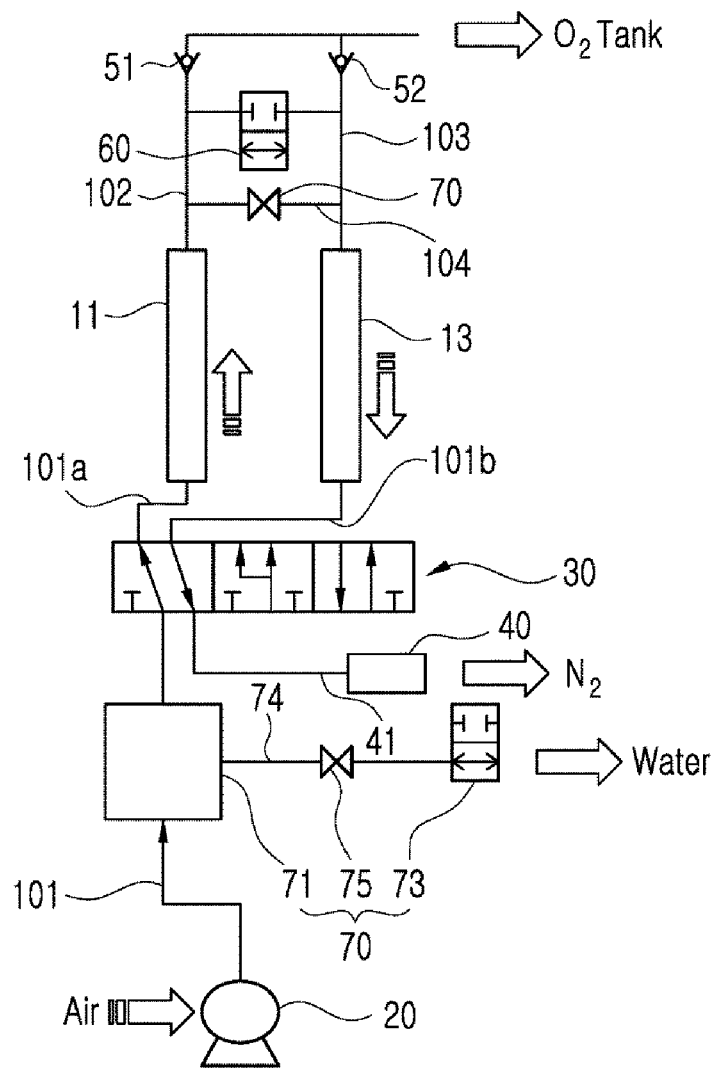

Subsequently, FIG. 6 is a drawing for explaining a process of pressurization of the first adsorption bed 11 and a water removing process.

Referring to FIG. 6, while the pressurized air is being supplied to the first adsorption bed 11, the water removing regulating valve 73 is turned on such that the water in the water separation space 72 is discharged to the outside. The water removing process is performed at the final stage of the pressurization of the first adsorption bed 11. At this time, the water removing process may be performed for a predetermined time, and for example the predetermined time may be set between 0.1 to 1 second.

Figure 7:
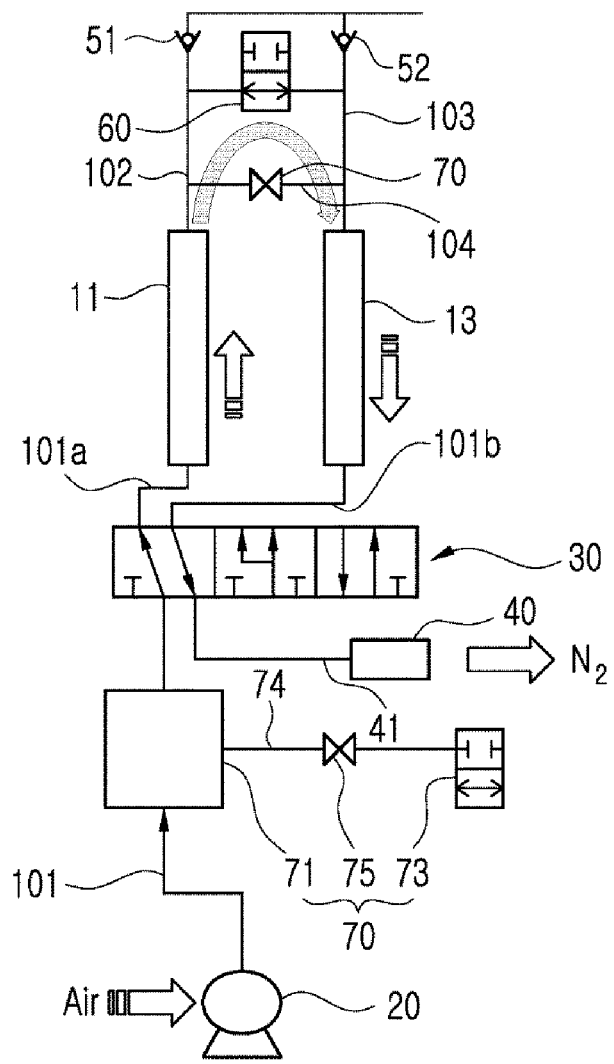

Subsequently, FIG. 7 is a drawing for explaining a process of equalizing pressures of upper portions of the first adsorption bed 11 and the second adsorption bed 13.

This process may be performed by moving air of the upper portion of the first adsorption bed 11 to the upper portion of the second adsorption bed 13 when the pressure of the first adsorption bed 11 reaches a predetermined pressure.

For example, according to an embodiment of the present invention, the process of FIG. 7 for equalizing pressures of the upper portions of the first adsorption bed 11 and the second adsorption bed 13 may be initiated at the time of termination of the water removing process of FIG. 6. Referring to FIG. 7, air inside of the first adsorption bed 11 is allowed to move to the second adsorption bed 13 by turning on the on/off valve 60 which is disposed at the upper side of the first adsorption bed 11 and the second adsorption bed 13, so that the pressures of the upper portions of the first adsorption bed 11 and the second adsorption bed 13 become similar to one another. At this time, the flow channel regulating valve unit 30 forms a flow channel allowing nitrogen within the second adsorption bed 13 to be discharged via the exhaust sound absorber 40. Accordingly, the efficiency of the oxygen concentration can be improved.

Figure 8:
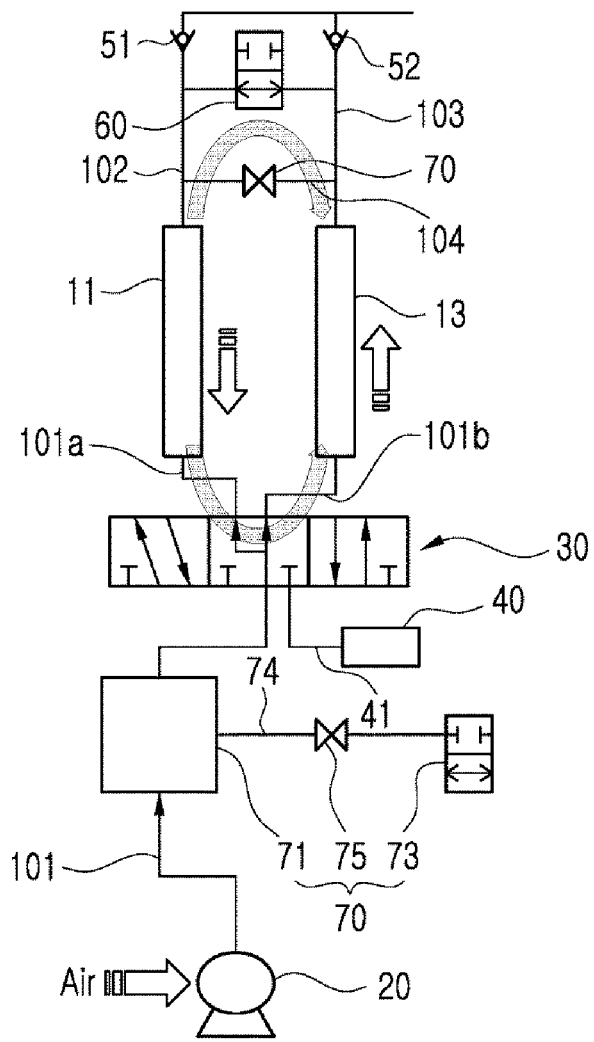

Subsequently, FIG. 8 is a drawing for explaining a process of equalizing pressures of upper and lower portions of the first adsorption bed 11 and the second adsorption bed 13.

Referring to FIG. 8, the on/off valve 60 which is disposed on the upper side of the adsorption beds 11 and 13 is maintained to be on, and the flow channel regulating valve unit 30 forms a flow channel which connect the lower portions of the first adsorption bed 11 and the second adsorption bed 13. Thereby, air in the lower portion of the first adsorption bed 11 moves to the lower portion of the second adsorption bed 13, so that the pressures of the lower portions of the first adsorption bed 11 and the second adsorption bed 13 become similar to one another. Accordingly, the efficiency of the oxygen concentration can be improved and the energy required for pressurization in the next process can be reduced.

The processes of nitrogen adsorption in the first adsorption bed 11 has been described in the above referring to FIG. 5 to FIG. 8, and the processes of nitrogen adsorption in the second adsorption bed 13 will be described hereinafter referring to FIG. 9 to FIG. 12. At this time, the processes in the first adsorption bed 11 and the second adsorption bed 13 can be performed in the same manner FIG. 9 is a drawing for explaining a process of nitrogen adsorption as a result of a pressurization process in the second adsorption bed 13.

Figure 9:
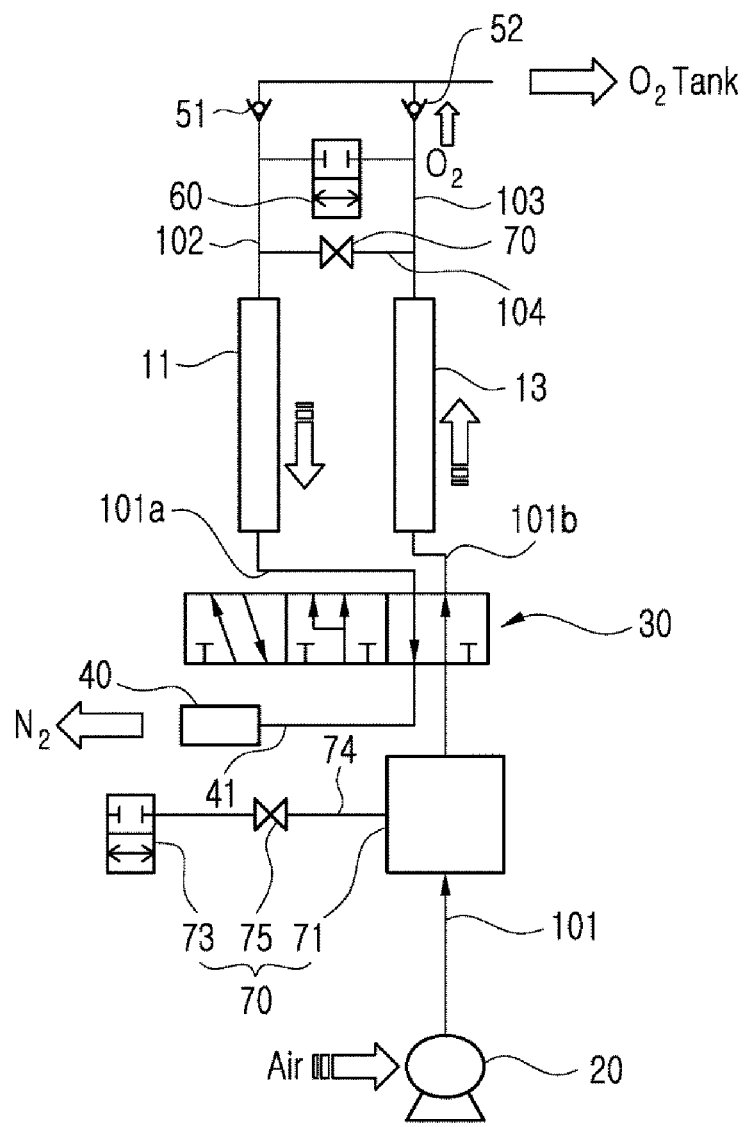

Referring to FIG. 9, the pressurized air supplied by the air supplier 20 is supplied to the second adsorption bed 13 via the flow channel regulating valve unit 30. Thus, the pressure in the second adsorption bed 13 increases so that nitrogen adsorption occurs and the air from which nitrogen is removed is supplied to the oxygen tank after passing the check valve 52. At this process, the on/off valve 60 which is disposed at upper sides of the adsorption beds 11 and 13 is maintained to be off. At this time, a portion of the air discharged from the second adsorption bed 13 flows into the first adsorption bed 11 via the orifice 70, and the air entering into the first adsorption bed 11 is discharged to the outside after passing the flow channel regulating valve unit 30 and the exhaust sound absorber 40. At this time, nitrogen which is adsorbed in the first adsorption bed 11 during the previous cycle is discharged together with air.

Figure 10:
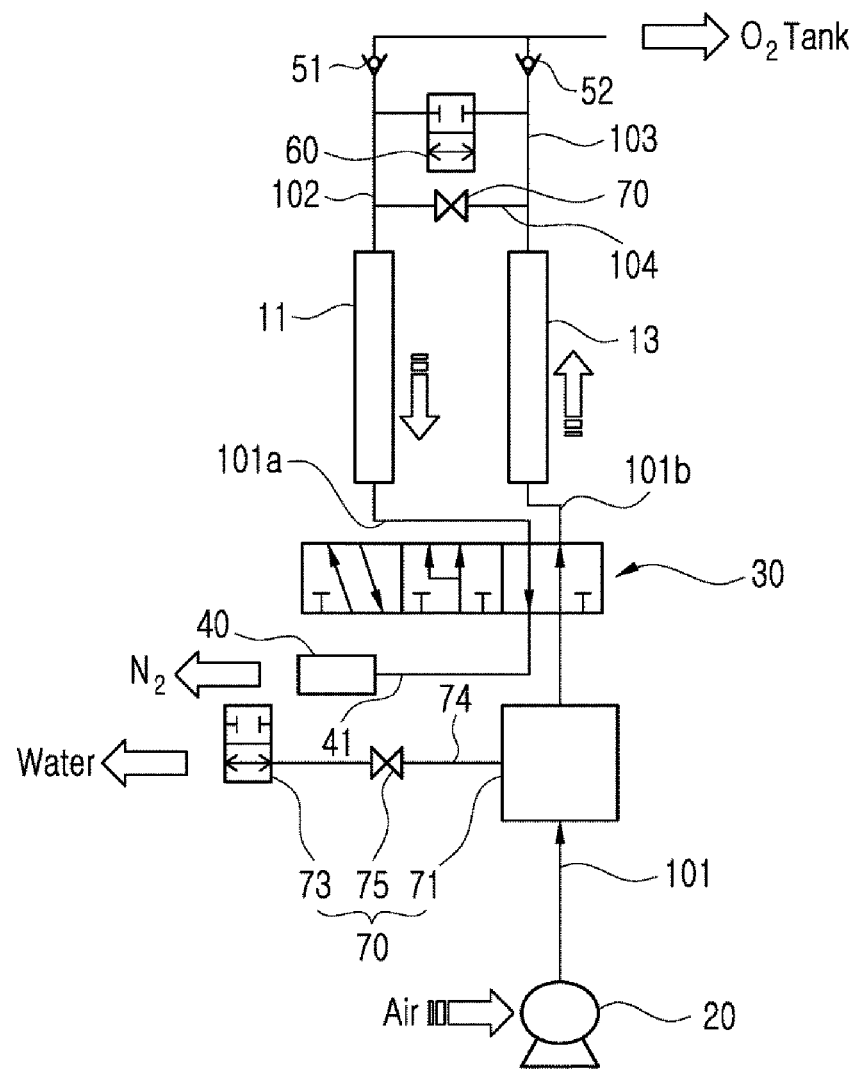

Subsequently, FIG. 10 is a drawing for explaining a process of pressurization of the second adsorption bed 11 and a water removing process.

Referring to FIG. 10, while the pressurized air is being supplied to the second adsorption bed 13, the water removing regulating valve 73 is turned on such that the water in the water separation space 72 is discharged to the outside. The water removing process is performed at the final stage of the pressurization of the second adsorption bed 13. At this time, the water removing process may be performed for a predetermined time, and for example the predetermined time may be set between 0.1 to 1 second.

Figure 11:
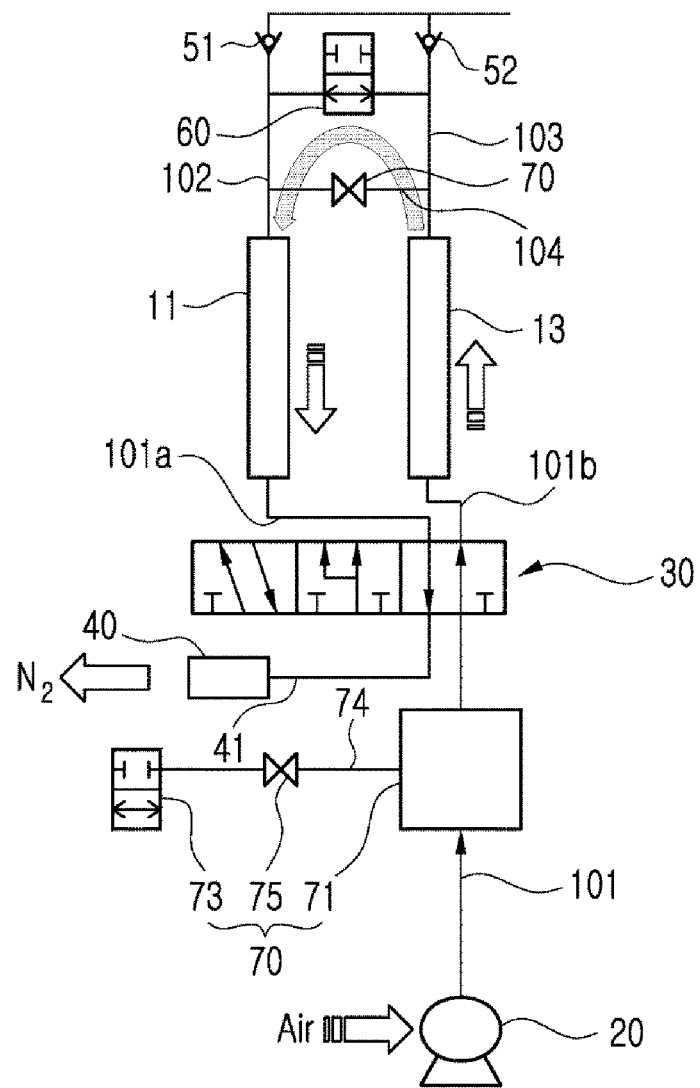

Subsequently, FIG. 11 is a drawing for explaining a process of equalizing pressures of upper portions of the first adsorption bed 11 and the second adsorption bed 13.

This process may be performed by moving air of the upper portion of the second adsorption bed 13 to the upper portion of the first adsorption bed 11 when the pressure of the second adsorption bed 13 reaches a predetermined pressure.

For example, according to an embodiment of the present invention, the process of FIG. 11 for equalizing pressures of the upper portions of the first adsorption bed 11 and the second adsorption bed 13 may be initiated at the time of termination of the water removing process of FIG. 10. Referring to FIG. 11, air inside of the second adsorption bed 13 is allowed to move to the first adsorption bed 11 by turning on the on/off valve 60 which is disposed at the upper side of the first adsorption bed 11 and the second adsorption bed 13, so that the pressures of the upper portions of the first adsorption bed 11 and the second adsorption bed 13 become similar to one another. At this time, the flow channel regulating valve unit 30 forms a flow channel allowing nitrogen within the first adsorption bed 11 to be discharged via the exhaust sound absorber 40. Accordingly, the efficiency of the oxygen concentration can be improved.

Figure 12:
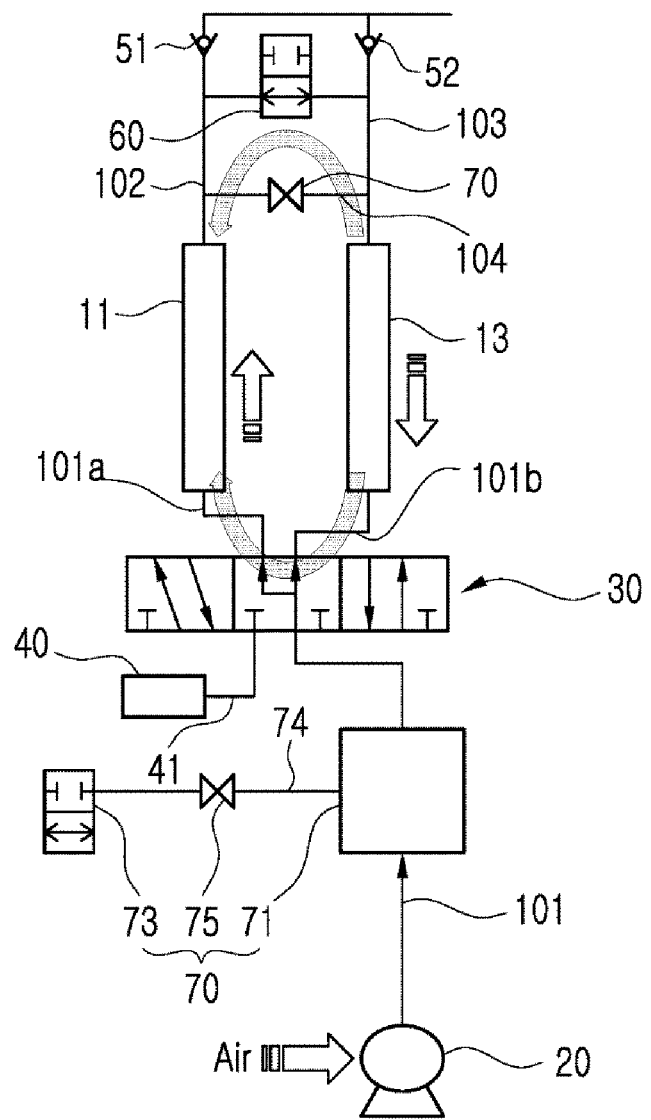

Subsequently, FIG. 12 is a drawing for explaining a process of equalizing pressures of upper and lower portions of the first adsorption bed 11 and the second adsorption bed 13.

Referring to FIG. 12, the on/off valve 60 which is disposed on the upper side of the adsorption beds 11 and 13 is maintained to be on, and the flow channel regulating valve unit 30 forms a flow channel which connect the lower portions of the first adsorption bed 11 and the second adsorption bed 13. Thereby, air in the lower portion of the second adsorption bed 13 moves to the lower portion of the first adsorption bed 11, so that the pressures of the lower portions of the first adsorption bed 11 and the second adsorption bed 13 become similar to one another. Accordingly, the efficiency of the oxygen concentration can be improved and the energy required for pressurization in the next process can be reduced.

Pressure changes in the first and second adsorption beds 11 and 13 during the above-described will be explained with reference to FIG. 13 hereinafter.

Figure 13:
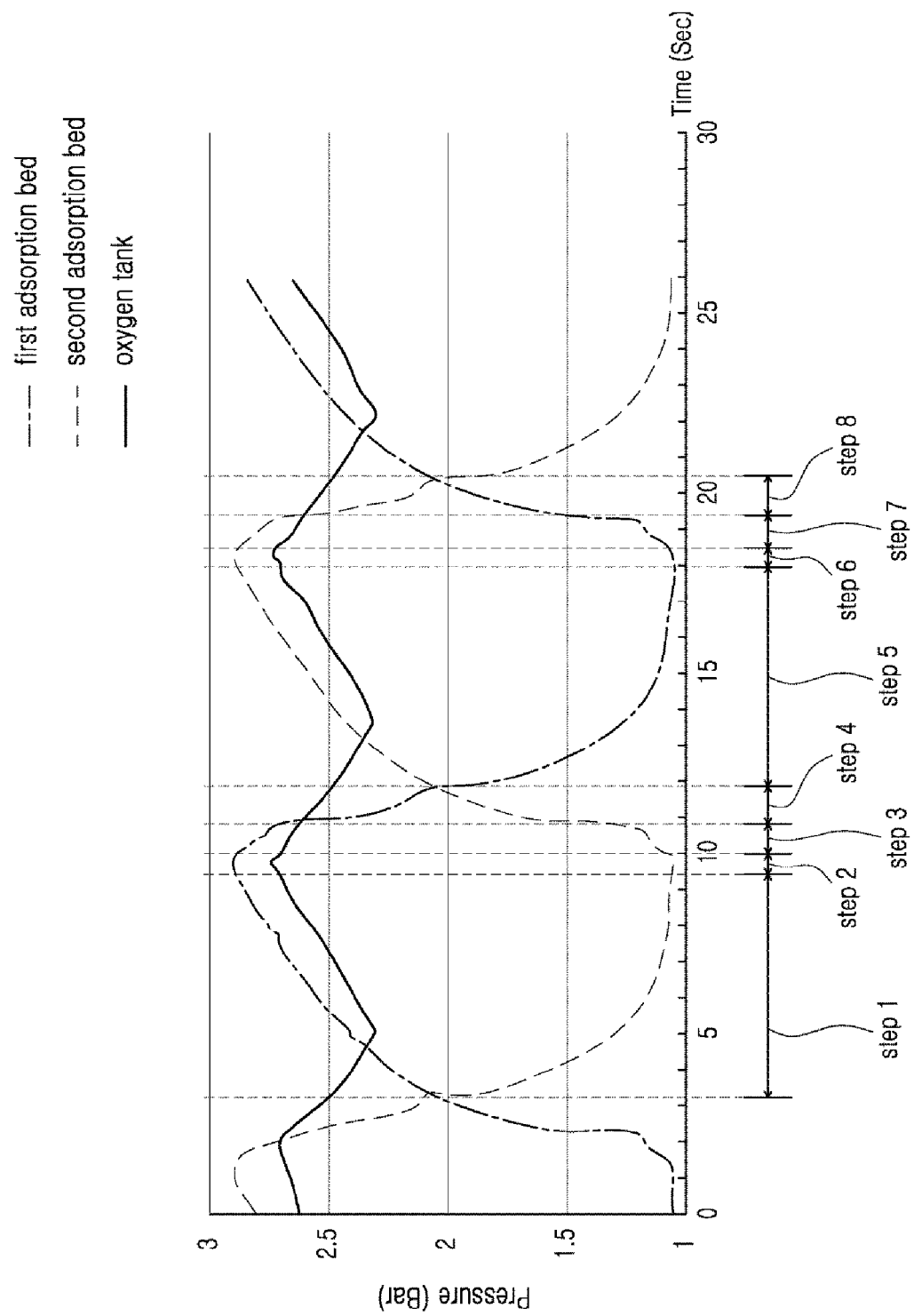
FIG. 13 is a drawing showing pressure changes in an oxygen concentrating processes of an oxygen concentrating apparatus according to an embodiment of the present invention.

Referring to FIG. 13, the pressure of the first adsorption bed 11 gradually increases during the process (designated by "step 1" in FIG. 13) of pressurization of the first adsorption bed 11.

Next, the water removing process (designated by "step 2" in FIG. 13) is performed in a state of pressurizing the first adsorption bed 11 at the final stage of the pressurization, and at this time a portion of the pressurized air which will be supplied to the first adsorption bed 11 is discharged to the outside via the water removing unit, so the pressure in the first adsorption bed 11 is maintained without substantial change Next, in the process (designated by "step 3" in FIG. 13) for equalizing the pressures of the upper portions of the first and second adsorption beds 11 and 13 by the movement of air in the upper portion of the first adsorption bed 11 to the upper portion of the second adsorption bed 13, the pressure in the first adsorption bed 11 decreases.

Next, in the process (designated by "step 4" in FIG. 13) for equalizing the pressures of the upper and lower portions of the first and second adsorption beds 11 and 13 by the movement of the air in the upper and lower portions of the first adsorption bed 11 to the upper and lower portions of the second adsorption bed 13, the pressure in the first adsorption bed 11 further decreases.

Next, in the process (designated by "step 5" in FIG. 13) of pressurization of the second adsorption bed 13, the air in the first adsorption bed 11 is discharged to the outside, so the pressure in the first adsorption bed 11 further decreases.

Next, in the water removing process (designated by "step 6" in FIG. 13) of the second adsorption bed 13, the pressure of the first adsorption bed 11 is substantially maintained at the same value.

Next, in the process (designated by "step 7" in FIG. 13) for equalizing the pressures of the upper portions of the first and second adsorption beds 11 and 13 by the movement of air in the upper portion of the second adsorption bed 13 to the upper portion of the first adsorption bed 11, the pressure in the first adsorption bed 11 decreases.

Next, in the process (designated by "step 8" in FIG. 13) for equalizing the pressures of the upper and lower portions of the first and second adsorption beds 11 and 13 by the movement of the air in the upper and lower portions of the second adsorption bed 13 to the upper and lower portions of the first adsorption bed 11, the pressure in the first adsorption bed 11 further decreases.

At this time, while the pressurization process of the first adsorption bed 11 is performed, the process corresponding to the step 8 of the first adsorption bed 11 is performed in the second adsorption bed 13, and then processes corresponding to the processes of step 1 to step 7 of the first adsorption bed 11 are sequentially performed in the second adsorption bed 13. The processes of FIG. 13 form one cycle, and this cycle is repeated.

Meanwhile, in another embodiment of the present invention the starting point of the water removing process can be altered. Although in an embodiment explained referring to FIG. 5 to FIG. 12 the water removing process is initiated at the final stage of the pressurization process of the adsorption bed and the pressure equalization process of the upper portions is initiated with the termination of the pressurization process and the water removing process, in another embodiment of the present invention the water removing process and the pressure equalization process of the upper portions of the adsorption beds are simultaneously initiated with the termination of the pressurization process. That is, the water removing process is initiated together with the pressure equalization process of the upper portions of the adsorption beds and is performed for the predetermined time.

Not shown in the drawing, a controller for controlling various valves, the air supplier or the like may be provided, and the controller may include a microprocessor and related hardware and software. The controller may have data and program for performing the oxygen concentrating process.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An oxygen concentrating method using an oxygen concentrating apparatus comprising a first adsorption bed and a second adsorption bed which are respectively formed to allow air supplied at lower portions thereof move upwardly and are respectively filled with absorbent capable of selectively adsorbing nitrogen relative to oxygen and performing oxygen centration by alternatively performing a pressurization process and a depressurization process of the first adsorption bed and the second adsorption bed, comprising:

performing a nitrogen adsorption in the first adsorption bed by supplying pressurized air to the first adsorption bed so as to increase pressure of the first adsorption bed and at the same time removing nitrogen from the second adsorption bed;

equalizing pressures of upper portions of the first adsorption bed and the second adsorption bed by moving air of the upper portion of the first adsorption bed to the upper portion of the second adsorption bed when pressure of the first adsorption bed becomes a predetermined pressure;

equalizing pressures of upper and lower portions of the first adsorption bed and the second adsorption bed by moving air of the upper portion of the first adsorption bed to the upper portion of the second adsorption bed and by moving air of the lower portion of the first adsorption bed to the lower portion of the second adsorption bed;

performing a nitrogen adsorption in the second adsorption bed by supplying pressurized air to the second adsorption bed so as to increase pressure of the second adsorption bed and at the same time removing nitrogen from the first adsorption bed;

equalizing pressures of upper portions of the first adsorption bed and the second adsorption bed by moving air of the upper portion of the second adsorption bed to the upper portion of the first adsorption bed when pressure of the second adsorption bed becomes a predetermined pressure;

equalizing pressures of upper and lower portions of the first adsorption bed and the second adsorption bed by moving air of the upper portion of the second adsorption bed to the upper portion of the first adsorption bed and by moving air of the lower portion of the second adsorption bed to the lower portion of the first adsorption bed; and removing water separated from the pressurized air which will be supplied to the first adsorption bed and the second adsorption bed for a predetermined time.

2. The oxygen concentrating method of claim 1, wherein the removing of the separated water is initiated at the starting point of the equalizing the pressure of the upper portions and is performed for the predetermined time.

3. The oxygen concentrating method of claim 1, wherein the removing of the separated water is initiated during the supplying of the pressurized air to the first adsorption bed and the second adsorption bed and is performed for the predetermined time, and wherein the equalizing of the pressure of the upper portions is initiated after termination of the removing the separated water.

4. The oxygen concentrating method of claim 1, wherein the predetermined time is set between 0.1 to 1 second.

5. An oxygen concentrating apparatus comprising:

at least one adsorption bed which is filled with absorbent capable of selectively adsorbing nitrogen relative to oxygen;

an air supplier which supplies pressurized air to the adsorption bed;

a flow channel regulating valve unit which regulates flow channels by allowing the pressurized air to be supplied to the adsorption bed from the air supplier and by allowing the air to be discharged from the adsorption bed to be depressurized such that a nitrogen adsorption process and a nitrogen desorption process are alternately performed; and a water removing unit which separates water from the pressurized air supplied from the air supplier and removes the separated water, wherein the flow channel regulating unit and the water removing unit are at least partially housed within a single housing, wherein the water removing unit comprises a water separation tank which defines a water separation space in which water is separated from the pressurized air supplied from the air supplier, wherein the housing comprises a first air inlet which is extruded to the outside thereof so as to supply the pressurized air of the air supplier to the water separation space, a second air inlet which is extruded to the outside thereof so as to supply the pressurized air of the air supplier to the flow channel regulating unit, and an air moving passage which is formed so as to discharge the air having passed the water separation space to the outside, and further comprising a cover which is selectively connected to cover the second air inlet and an outlet of the air moving passage so as to selectively form an air moving space including the second air inlet and the outlet of the air moving passage.

6. The oxygen concentrating apparatus of claim 5, wherein the water removing unit comprises a water removing regulating valve which operates to selectively remove the water which is stored in the water separation space.

7. An oxygen concentrating apparatus comprising:

at least one adsorption bed which is filled with absorbent capable of selectively adsorbing nitrogen relative to oxygen;

an air supplier which supplies pressurized air to the adsorption bed;

a flow channel regulating valve unit which regulates flow channels by allowing the pressurized air to be supplied to the adsorption bed from the air supplier and by allowing the air to be discharged from the adsorption bed to be depressurized such that a nitrogen adsorption process and a nitrogen desorption process are alternately performed; and a water removing unit which separates water from the pressurized air supplied from the air supplier and removes the separated water, wherein the flow channel regulating unit and the water removing unit are at least partially housed within a single housing, wherein the at least one adsorption bed comprises a first adsorption bed and a second adsorption bed, and further comprising:

an on/off valve which is disposed to selectively connect upper communication ports of the first adsorption bed and the second adsorption bed; and an orifice which is disposed in a flow channel connecting the upper communication ports, wherein the flow channel regulating valve unit selectively regulates flow channels of the air supplier, lower communication ports of the first adsorption bed and the second adsorption bed, and a nitrogen discharging passageway, wherein the pressurized air is supplied to the first adsorption bed in a state that the on/off valve is off so that a nitrogen adsorption process is performed in the first adsorption bed, wherein the water removing unit operates to remove water separated from the pressurized air in a state that the on/off valve is on after the nitrogen adsorption process in the first adsorption bed is terminated or while the nitrogen adsorption process in the first adsorption bed is being performed, wherein the pressurized air is supplied to the second adsorption bed in a state that the on/off valve is off so that a nitrogen adsorption process is performed in the second adsorption bed, and wherein the water removing unit operates to remove water separated from the pressurized air in a state that the on/off valve is on after the nitrogen adsorption process in the second adsorption bed is terminated or while the nitrogen adsorption process in the second adsorption bed is being performed.

* * * * *